United States Patent Office 3,070,613
Patented Dec. 25, 1962

3,070,613
6-METHYL STEROIDS AND METHOD FOR PREPARATION OF SAME
Suzanne Patricia Barton, Bernard Ellis, and Vladimir Petrow, all of London, England, assignors to The British Drug Houses Limited
No Drawing. Filed Oct. 6, 1960, Ser. No. 60,790
Claims priority, application Great Britain Oct. 12, 1959
7 Claims. (Cl. 260—397.4)

This invention is for improvements in or relating to organic compounds and has particular reference to a method for the preparation of 17α-acyloxy-6-methyl-3-oxo-Δ$^{4,6}$-steroids of the pregnane series having the general formula I below.

It is an object of the invention to provide a novel process for the preparation of 17α-acyloxy-6-methyl-3-oxo-Δ$^{4,6}$-steroids of the pregnane series which are of value on account of their biological activity and in particular their progestational activity. In addition, the compounds possess in varying degrees the ability to inhibit ovulation in certain animal species. Thus, for example, the method of the invention may be used for the preparation of the highly potent orally active progestational agent 17α-acetoxy-6-methylpregna-4,6-diene-3,20-dione.

It is another object of the invention to provide certain novel 17α-acyloxy-6-methylpregna-4,6-diene-3,20-diones substituted in position 16 by a methyl group, which compounds are highly potent progestational agents when administered by the oral route.

According to the present invention there is provided a method for the preparation of 17α-acyloxy-6-methyl-3-oxo-Δ$^{4,6}$-steroids of the pregnane series having the general Formula I

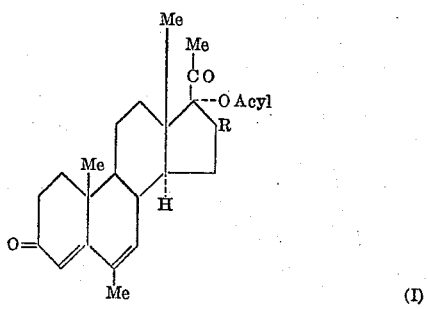

(I)

where R is a hydrogen atom or a methyl group, which method comprises treating a substituted progesterone or 17-iso-progesterone of the general Formula II

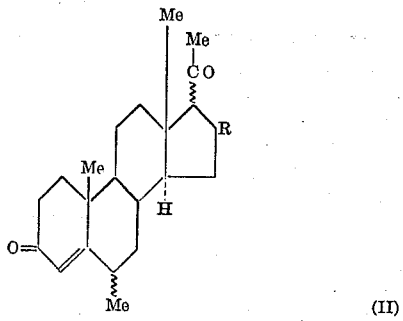

(II)

(where R has the same meaning as above) with acetic anhydride to form a 3,20-diacetoxy-6-methylpregna-3,5,17(20)-triene of Formula III

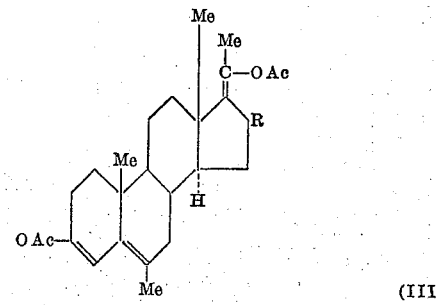

(III)

(where R has the same meaning as above), oxidising the 3,5,17(20)-triene (III) with a per-acid to give a 17α,20α-epoxy-6β-hydroxy-6α-methylpregn-4-en-3-one of Formula IV

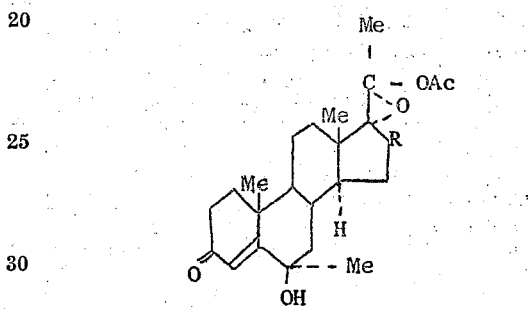

(IV)

(where R has the same meaning as above), saponifying the 17α,20α-epoxy-6β-hydroxy-6α-methylpregn-4-en-3-one to give the corresponding 17α-hydroxy compound (V)

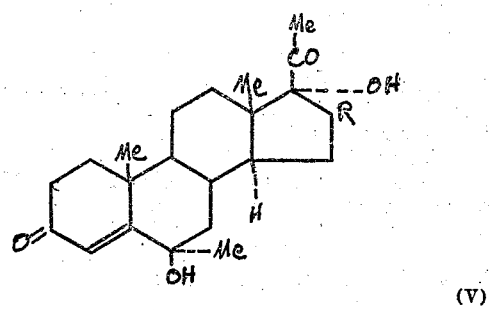

(V)

(where R has the same meaning as above), and acylating the 17α-hydroxy group of the foregoing compound with concomitant dehydration of the 6β-hydroxyl group to give the desired compound (I).

The invention also provides the following new compounds: 6β,17α-dihydroxy-6α,16β-dimethylpregn-4-ene-3,20-dione. 17α-acetoxy-6,16β-dimethylpregna-4,6-diene-3,20-dione, which is of value on account of its progestational activity, which renders it of value in the control of fertility, for example, in the veterinary field: 6β,17α-dihydroxy-6α,16α-dimethylpregn-4-ene-3,20-dione. 17α-acetoxy-6,16α-dimethylpregna-4,6-diene-3,20-dione, which is of value on account of its progestational activity. Thus, for example, in the McPhail modifications of the Clauberg assay, the substance on oral administration has many times the progestational activity of dimethisterone (6α,21-dimethylethisterone). As dimethylethisterone has about 10 times the progestational activity of ethisterone, the progestational potency of 17α-acetoxy-6,16α-dimethyl-pregna-4,6-diene-3,20-dione is seen to be of a very high order, thereby rendering it of value in medical practice in the treatment of such conditions as secondary amenorrhoea, menorrhagia, metropathia and dysmenorrhoea.

Conversion of the substituted progesterone or 17-isoprogesterone (II; R=H or CH₃) into a 3,5,17(20)-triene of Formula III (R=H or CH₃) may be achieved, for example, by treating compound (II) with a large excess of acetic anhydride and a small amount of an acidic catalyst, such as toluene-p-sulphonic acid. The reaction is facilitated by slow distillation of the mixture at atmospheric pressure, and is substantially complete in a few hours. The product is then isolated by methods well known to those skilled in the art, and may be purified, if desired, by chromatography over an inert adsorbent, such as acid-washed alumina. Alternatively, the compound of Formula II may be treated for several hours at room temperature with a mixture of acetic anhydride, an inert solvent of high dielectric constant such as carbon tetrachloride, and a trace of an acidic catalyst, preferably perchloric acid. The product is then isolated by conventional methods and purified by chromatography if desired. For the purpose of the present invention, however, it is not essential for the 3,5,17(20)-triene (III) to be obtained in pure crystalline condition; the total product of the reaction may, in fact, be employed in its crude state for the next stage of the process.

Oxidation of the 3,5,17(20)-triene (III) to the intermediate (IV) may be effected by treating compound (III) in an inert solvent, such as benzene, ether or chloroform, with an excess of a per-acid, such as perbenzoic acid or monoperphthalic acid. The reaction is carried out preferably within the temperature range 5° to 25° C. and is generally complete within 24 hours. The product, containing the intermediate (IV) is isolated by conventional methods and may, without further purification, be converted into material containing the 17α-hydroxy compound (V) by saponification with alkali, for example, by a brief heating under reflux with a dilute solution of sodium or potassium hydroxide in methanol or ethanol. At this stage of the process it is preferable to isolate the 17α-hydroxy compound (V) from the total crude saponification product, and to obtain it in a reasonably pure condition by, for example, crystallisation from a suitable solvent.

Transformation of compound (V) into the required 17α-acyloxy-6-methyl-3-oxo-Δ⁴,⁶-steroid (I) may be accomplished in one operation by treating compound (V) in a lower acyl anhydride, or a mixture of lower acyl anhydride and the corresponding lower acyl acid, with a suitable catalyst such as perchloric acid, zinc chloride or toluene-p-sulphonic acid. The reaction is best carried out at room temperature and is complete in a relatively short time. The product is then isolated, and may be purified by well-known techniques such as chromatography and crystallisation.

Following is a description, by way of example, of methods for carrying the invention into effect.

The initial material employed in Example 1 was prepared as follows:

Raney nickel sludge (150 ml.) was washed with water until the washings were neutral, then with ethanol, and a suspension in ethanol (300 ml.) agitated in an atmosphere of hydrogen until uptake of gas had ceased. 3β-acetoxy-6,16-dimethylpregna-5,16-dien-20-one (37 g.) prepared by the process described in Example 1 of Belgian Patent No. 580,502, published in July 1959, in ethyl acetate (300 ml.) was added to the catalyst suspension, and the mixture hydrogenated until uptake of hydrogen had ceased. The product obtained after removal of the catalyst and solvents was purified from aqueous ethanol to give 3β-acetoxy-6,16β-dimethylpregn-5-en-20-one in needles, M.P. 153 to 154° C., $[\alpha]_D^{20}$ —42° (c. 0.94 in chloroform).

Saponification of the foregoing compound with aqueous methanolic potassium hydrogen carbonate gave 6,16β-dimethyl-3β-hydroxypregn-5-en-20-one which crystallised from aqueous ethanol in needles, M.P. 134 to 135° C. after drying for several hours at 40° C., $[\alpha]_D^{23}$ —32° (c. 0.9 in chloroform).

A solution of the foregoing compound (9.5 g.) in dry toluene (250 ml.) and cyclohexanone (130 ml.) was distilled until 70 ml. of distillate had collected. Aluminium tert.-butoxide (15 g.) in toluene (150 ml.) was then added, and the mixture heated until reflux for 2 hours. Following the addition of Rochelle salt, the solvents were removed by steam distillation and the product isolated with chloroform. One crystallisation from aqueous methanol gave an intimate mixture of 6α,16β-dimethylprogesterone and 6α,16β-dimethyl-17-isoprogesterone, M.P. 125 to 130° C., $[\alpha]_D^{27}$ +41° (c. 1.0 in chloroform), which was used without further purification as initial material in Example 1 below.

6α,16β-dimethylprogesterone separated from aqueous methanol in needles, M.P. 189 to 192° C., $[\alpha]_D^{23}$ +114° (c. 1.36 in chloroform).

6α,16β-dimethyl-17-isoprogesterone separated from aqueous ethanol in flakes, M.P. 153 to 154° C., $[\alpha]_D^{27}$ +16° (c. 1.08 in chloroform).

EXAMPLE 1

*17α-Acetoxy-6,16β-Dimethylpregna-4,6-Diene-3,20-Dione*

A mixture (11.7 g.) of 6α,16β-dimethylprogesterone and 6α,16β-dimethyl-17-isoprogesterone (prepared as described above) in carbon tetrachloride (117 ml.) was treated for 3 hours at room temperature with acetic anhydride (17 ml.) containing 0.3 ml. of 50% aqueous perchloric acid. The mixture was then diluted with chloroform, washed with ice-cold 5% aqueous sodium hydroxide, water, and dried over anhydrous sodium sulphate. Removal of the solvents under reduced pressure gave a dark gum, which was dissolved in chloroform (50 ml.), treated with monoperphthalic acid (29.5 g.) in ether (360 ml.) and the mixture set aside overnight at room temperature. After washing with aqueous sodium hydrogen carbonate and water, and drying over anhydrous sodium sulphate, the solvents were removed in vacuo to give a viscous gum. This material in methanolic potassium hydroxide (80 ml. of 0.8 N) was heated under reflux for 15 minutes and the product isolated with ether. Crystallisation from acetone/hexane gave 6β,17α-dihydroxy-6α,16β,dimethylpregn-4-ene-3,20-dione in needles, M.P. 240 to 248° C., $[\alpha]_D^{25}$ +31° (c. 0.49 in chloroform), $\lambda_{max}$. 238 mμ, log ε 4.10.

A suspension of the foregoing compound (0.31 g.) in acetic anhydride (5 ml.) was treated with 2 drops of 72% perchloric acid. After 15 minutes the mixture was treated with water and the product isolated with ether. It was purified by chromatography on alumina, employing light petroleum/benzene (3:2) as eluant, and crystallisation from acetone/hexane. 17α-acetoxy-6,16β-dimethylpregna-4,6-diene-3,20-dione separated in blades, M.P. 204 to 209° C., $\lambda_{max}$. 287.5 mμ, log ε 4.33.

EXAMPLE 2

*17α-Acetoxy-6-Methylpregna-4,6-Diene-3,20-Dione*

A solution of 6α- or 6β-methylprogesterone (20 g.) (Burn, Ellis, Petrow, Stuart-Webb and Williamson, J.C.S., 1957, 4092) and toluene-p-sulphonic acid (7 g.) in acetic anhydride (2 l.) was gently boiled, the solvent being permitted to distil during 8 hours. The residual dark mixture (200 ml.) was treated with water, and the product isolated with ether. It was dissolved in ether/light petroleum (1:1) and the solution filtered through a column of acid-washed alumina. Removal of the solvents gave a gum, which in benzene (100 ml.), was treated with perbenzoic acid (50 g.) in benzene (950 ml.) for 24 hours at room temperature. The mixture was washed with aqueous sodium hydrogen carbonate, water, dried over sodium sulphate, and the solvent removed under reduced pressure. A solution of the gummy product in ethanolic sodium hydroxide (150 ml. of 4%) was refluxed for 15 minutes, the product isolated with ether, and crystallised to give 6β,17α-dihydroxy-6α-methylpregn-4-ene-3,20-dione.

The foregoing compound (0.5 g.) in a mixture of acetic anhydride (2.5 ml.) and acetic acid (10 ml.) was treated with 1 drop of 72% perchloric acid. After 20 minutes, water was added, and the product isolated with ether. Purification from aqueous methanol gave 17α-acetoxy-6-methylpregna-4,6-diene-3,20-dione in needles, M.P. 214 to 215° C., $[\alpha]_D^{20}$ —45° C., identical in every respect with an authentic specimen.

EXAMPLE 3

A solution of 6α,16α-dimethylprogesterone (15.75 g.) prepared by the process described in British Patent No. 841,003 of July 13, 1960, and toluene-p-sulphonic acid (6 g.) in acetic anhydride (1.6 l.) was gently boiled, the solvent being permitted to distill during 7 hours. The residual dark mixture (150 ml.) was treated with water, and the product isolated with ether. Light petroleum (200 ml.; B.P. 40 to 60° C.) was added to its solution in ether (100 ml.), a small precipitate of dark amorphous material was removed by filtration, and the filtrate was passed through a column of acid-washed alumina (200 gm.). Elution with ether/light petroleum (2:1) gave a viscous gum which was dissolved in ether (100 ml.) and treated for 24 hours with a solution of monoperphthalic acid (23 g.) in ether (350 ml.). The mixture was then washed with aqueous sodium carbonate, water, dried and the solvent removed. A solution of the residue in methanol (80 ml.) and water (20 ml.) containing potassium hydroxide (3 g.) was heated under reflux for 10 minutes and neutralised with acetic acid, cooled and filtered. The product had a M.P. 270 to 274° C. It was purified from a large volume of methanol giving 6β,17α-dihydroxy-6α,16α-dimethylpregn-4-en-3,20-dione plates M.P. 288 to 290° C., $[\alpha]_D^{20}$ +17° (c. 0.83 in pyridine).

The foregoing compound (1.3 g.) was suspended in acetic anhydride (15 ml.). Perchloric acid (2 drops, 72%) was added, and after 10 minutes the mixture was poured into water and the product isolated with ether. Chromatographic purification on alumina (30 g.) and crystallisation from acetone/hexane gave 17α-acetoxy-6,16α-dimethylpregna-4,6-diene-3,20-dione, prisms M.P. 202 to 204° C., $[\alpha]_D^{22}$ + 21° (c. 0.99 in chloroform) $\lambda_{max.}$ 286 mμ, log ε 4.3.

EXAMPLE 4

Formula for 1,000 tablets:

Materials:

| | |
|---|---|
| 17α - acetoxy - 6,16α-dimethylpregna - 4,6-diene-3,20-dione | 0.5 g. |
| Lactose, B.P. | 125 g. |
| Magnesium stearate | a sufficient quantity. |
| Starch paste, 10% | a sufficient quantity. |
| Starch, B.P. | sufficient to produce 150 g. |

PROCESS

The steroid, lactose, and two-thirds of the starch are mixed together, moistened with a suitable quantity of starch paste and granulated through a No. 20 mesh screen.

The granule is dried at 50° C., again passed through a No. 20 mesh screen, and the magnesium stearate added, together with sufficient starch to produce the required weight. The granule is compressed to produce tablets each weighing 150 mg.

We claim:

1. A method for the preparation of 17α-acyloxy-6-methyl-3-oxo-Δ$^{4,6}$-steroids of the pregnane series having the general formula

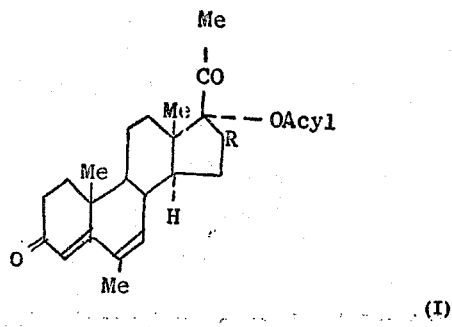

(I)

where R is a group selected from the class consisting of hydrogen and methyl which method comprises treating a steroid selected from the group consisting of a substituted progesterone and 17-isoprogesterone of the general formula

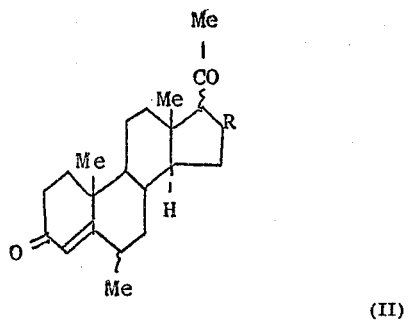

(II)

(where R has the same meaning as above) with acetic anhydride to form a 3,20-diacetoxy-6-methylpregna-3,5,17(20)-triene of formula

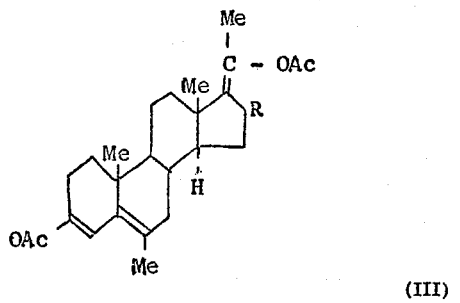

(III)

(where R has the same meaning as above), oxidising the 3,5,17(20)-triene (III) with a per-acid to give a 17α,20α-epoxy-6β-hydroxy-6α-methylpregn-4-en-3-one of formula (IV)

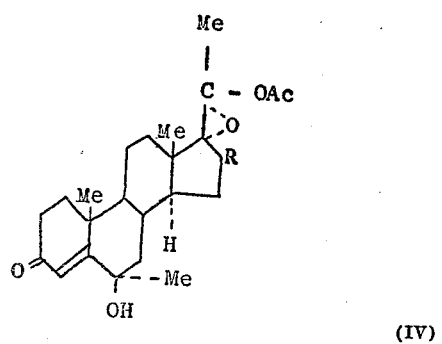

(IV)

(where R has the same meaning as above), saponifying the 17α,20α-epoxy-6β-hydroxy-6α-methylpregn-4-en-3-one to give the corresponding 17α-hydroxy compound (V)

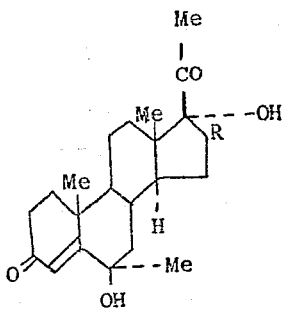

(V)

(where R has the same meaning as above), and acylating the 17α-hydroxy group of the foregoing compound with concomitant dehydration of the 6β-hydroxyl group to give the desired compound (I).

2. A method as claimed in claim 1 wherein the steroid starting material is treated with a large excess of acetic anhydride and a small amount of toluene-p-sulphonic acid.

3. A method as claimed in claim 1 wherein the saponification is effected with a dilute solution of potassium hydroxide in methanol.

4. A method as claimed in claim 1 wherein the saponification is effected with a dilute solution of sodium hydroxide in ethanol.

5. A method as claimed in claim 1 wherein the acylation and concomitant dehydration of the 6β-hydroxyl group is effected by treatment in a lower acyl anhydride with perchloric acid.

6. 6β,17α-dihydroxy-6α,16β-dimethylpregn - 4 - ene 3, 20-dione.

7. 6β,17α - dihydroxy - 6α,16α - dimethylpregn - 4-ene-3,20-dione.

References Cited in the file of this patent

UNITED STATES PATENTS

| | | |
|---|---|---|
| 2,891,079 | Dodson et al. | June 16, 1959 |
| 2,925,415 | Laken | Feb. 16, 1960 |